(12) United States Patent
Yasuda et al.

(10) Patent No.: US 11,667,190 B2
(45) Date of Patent: Jun. 6, 2023

(54) WORK VEHICLE

(71) Applicant: Kubota Corporation, Osaka (JP)

(72) Inventors: Toshifumi Yasuda, Sakai (JP); Hiroshi Takagi, Sakai (JP); Takashi Kuramoto, Sakai (JP)

(73) Assignee: Kubota Corporation, Osaka (JP)

( * ) Notice: Subject to any disclaimer, the term of this patent is extended or adjusted under 35 U.S.C. 154(b) by 91 days.

(21) Appl. No.: 17/121,908

(22) Filed: Dec. 15, 2020

(65) Prior Publication Data

US 2021/0284015 A1 Sep. 16, 2021

(30) Foreign Application Priority Data

Mar. 10, 2020 (JP) .............................. JP2020-041208

(51) Int. Cl.
| | |
|---|---|
| *B60K 17/16* | (2006.01) |
| *B60K 17/00* | (2006.01) |
| *B60K 17/35* | (2006.01) |
| *B60K 23/08* | (2006.01) |

(52) U.S. Cl.
CPC .............. *B60K 17/16* (2013.01); *B60K 17/00* (2013.01); *B60K 17/35* (2013.01); *B60K 23/08* (2013.01)

(58) Field of Classification Search
CPC ...... B60K 17/00; B60K 17/16; B60K 17/348; B60K 17/35; B60K 23/08; B60K 2023/0816; B60K 2023/0825; B60K 5/00; B60K 2005/003; B60Y 2200/20; B60Y 2200/22; B60Y 2400/411; B60Y 2400/42; B60Y 2400/421; B60Y 2400/423
See application file for complete search history.

(56) References Cited

U.S. PATENT DOCUMENTS

| | | | | |
|---|---|---|---|---|
| 4,850,447 A * | 7/1989 | Hirakushi | ............... | F16D 31/08 180/248 |
| 5,327,989 A * | 7/1994 | Furuhashi | ............ | B60K 17/165 180/908 |
| 7,610,980 B2 * | 11/2009 | Mori | .................. | B60K 23/0808 701/69 |
| 2004/0020700 A1 * | 2/2004 | Watson | ................ | B60K 28/165 180/247 |
| 2004/0188216 A1 * | 9/2004 | Yamazaki | ........... | F16D 25/0638 192/93 A |
| 2015/0011349 A1 * | 1/2015 | Downs | ................. | B60K 17/165 475/198 |
| 2015/0306954 A1 | 10/2015 | Matsuura et al. | | |

(Continued)

FOREIGN PATENT DOCUMENTS

| | | |
|---|---|---|
| DE | 102018206411 A1 | 10/2019 |
| JP | 2003172431 A | 6/2003 |
| KR | 20170061272 A * | 6/2017 |

*Primary Examiner* — James A English
*Assistant Examiner* — Daniel M. Keck
(74) *Attorney, Agent, or Firm* — The Webb Law Firm

(57) ABSTRACT

A work vehicle includes a power transmission unit having a differential device for transmitting power to left and right axles and a power transmission mechanism for transmitting power to the differential device, and a transmission shaft for transmitting power to the power transmission unit. The power transmission mechanism includes a first gear mechanism to which power from the transmission shaft is transmitted and a second gear mechanism for transmitting power from the first gear mechanism to the differential device.

7 Claims, 7 Drawing Sheets

(56) References Cited

U.S. PATENT DOCUMENTS

| | | | |
|---|---|---|---|
| 2015/0329148 A1* | 11/2015 | Borowicz | F16H 57/031 |
| | | | 280/783 |
| 2017/0166050 A1* | 6/2017 | Zink | B60K 17/165 |
| 2019/0063587 A1 | 2/2019 | Pydin | |
| 2020/0172103 A1* | 6/2020 | Itoo | B60K 23/0808 |

* cited by examiner

WORK VEHICLE

CROSS-REFERENCE TO RELATED APPLICATION

This application claims priority to Japanese Patent Application No. 2020-041208 filed Mar. 10, 2020, the disclosure of which is hereby incorporated by reference in its entirety.

BACKGROUND OF THE INVENTION

1. Field of the Invention

The present invention relates to a work vehicle.

2. Description of Related Art

Conventionally, a work vehicle disclosed in JP2003-172431 A is known for example. The work vehicle disclosed in JP2003-172431 A includes a power transmission unit (referred to as a "final speed reduction device (21)" in the document) having a differential device (referred to as a "differential limiting device (50)" in the document) for transmitting power to left and right axles (referred to as "front drive shafts (32), (33)" in the document) and a power transmission mechanism (referred to as "a drive pinion (54), a ring gear (75)" in the document) for transmitting power to the differential device, and a transmission shaft (referred to as a "front propeller shaft (31)" in the document) for transmitting power to the power transmission mechanism. The power transmission mechanism includes a drive gear (referred to as the "drive pinion (54)" in the document) to which power from the transmission shaft is transmitted and a driven gear (referred to as the "ring gear (75)" in the document) meshing with the drive gear. In the work vehicle disclosed in JP2003-172431 A, power from the transmission shaft is to be transmitted to the differential device via the drive gear and the driven gear.

With the work vehicle disclosed in JP2003-172431 A, between the transmission shaft and the differential device, the power from the transmission shaft is speed-reduced only by the one pair of gears, thus inviting disadvantageous enlargement of the driven gear (referred to as the "ring gear (75)" in the document), consequently enlargement of the power transmission unit.

In view of the above-described state of the art, there is a need for a work vehicle whose power transmission unit can be formed compact.

SUMMARY OF THE INVENTION

A work vehicle comprising:
a power transmission unit including:
a differential device for transmitting power to left and right axles;
a power transmission mechanism for transmitting power to the differential device; and
a transmission shaft for transmitting power to the power transmission unit;
wherein the power transmission mechanism includes:
a first gear mechanism to which power is transmitted from the transmission shaft; and
a second gear mechanism that transmits power from the first gear mechanism to the differential device.

With the above-described inventive arrangement, between the transmission shaft and the differential device, speed reduction (in two speed stages) of the power from the transmission shaft is made possible by the first gear mechanism and the second gear mechanism. This allows realization of compactization of a driven gear of the first gear mechanism and a driven gear of the second gear mechanism, consequently compactization of the power transmission unit.

According to one embodiment:
the first gear mechanism includes:
a first drive gear to which power is transmitted from the transmission shaft, and
a first driven gear rotatable about a rotational axis orthogonal to a rotational axis of the first drive gear and meshing with the first drive gear; and
the second gear mechanism includes:
a second drive gear rotatable about the same rotational axis as the first driven gear and rotatable with the first driven gear; and
a second driven gear rotatable about a rotational axis parallel with the rotational axis of the second drive gear and meshing with the second drive gear.

With the above-described inventive arrangement, the power from the transmission shaft is transmitted from the first drive gear to the first driven gear and then transmitted from the second drive gear rotatable together with the first driven gear to the second driven gear.

With the above, it is possible to set a speed reduction ratio between the transmission shaft and the differential device appropriately, with changing the rotational axis direction of the power from the transmission shaft to be in agreement with the rotational axis direction of the axle.

According to one embodiment:
the power transmission mechanism includes a support shaft provided to extend along a machine body left/right direction and supporting the first driven gear and the second drive gear, the support shaft being disposed downwardly of the axle.

With the above-described arrangement, it is readily possible to secure a space for disposing an object upwardly of the power transmission unit, by making the height position of the portion of the power transmission unit corresponding to the support shaft as low as possible.

According to one embodiment:
the power transmission unit includes a case which accommodates the differential device and the power transmission mechanism; and
the power transmission mechanism includes an input shaft provided to protrude rearwards from a rear portion of the case and supporting the first drive gear, the input shaft being disposed downwardly of the axle.

With the above-described arrangement, it is readily possible to secure a space for disposing an object upwardly of the input shaft, by making the height position of the input shaft as low as possible.

According to one embodiment:
a power steering device for steering left and right wheels is disposed upwardly of the input shaft.

With the above-described arrangement, the space available upwardly of the input shaft can be used as a space for disposing the power steering device.

According to one embodiment, the work vehicle further comprises:
a switchover device provided between the transmission shaft and the input shaft and configured to be capable of switching over between a power transmission state for transmitting the power from the transmission shaft to the input shaft and a power transmission blocking state for not transmitting the power from the transmission shaft to the input shaft;

wherein the switchover device is disposed rearwardly adjacent the power transmission unit.

With the above-described arrangement, an arrangement for switching the work vehicle between a two-wheel drive state and a four-wheel drive state can be easily realized by the switchover device. Further, the space available rearwardly adjacent the power transmission unit can be used as a space for disposing the switchover device.

According to one embodiment, the work vehicle further comprises:

left and right main frames extending long a machine body front/rear direction as seen in a side view;

wherein between front portions of the left and right main frames, there is formed a narrow width portion having a reduced spacing between the left and right main frames; and the power transmission unit and the switchover device are disposed in the narrow width portion.

With the above-described arrangement, the space of the narrow width portion can be used as a space for disposing the power transmission unit and the switchover device.

DETAILED DESCRIPTION OF PREFERRED EMBODIMENTS

A mode of embodying the present invention will be explained with reference to the accompanying drawings. Incidentally, in the following explanation, the direction of arrow F is defined as "machine body front side", the direction of arrow B is defined as "machine body rear side", the direction of arrow L is defined as "machine body left side", and the direction of arrow R is defined as "machine body right side", respectively.

[General Configuration of Multi-Purpose Vehicle]

Figure 1:
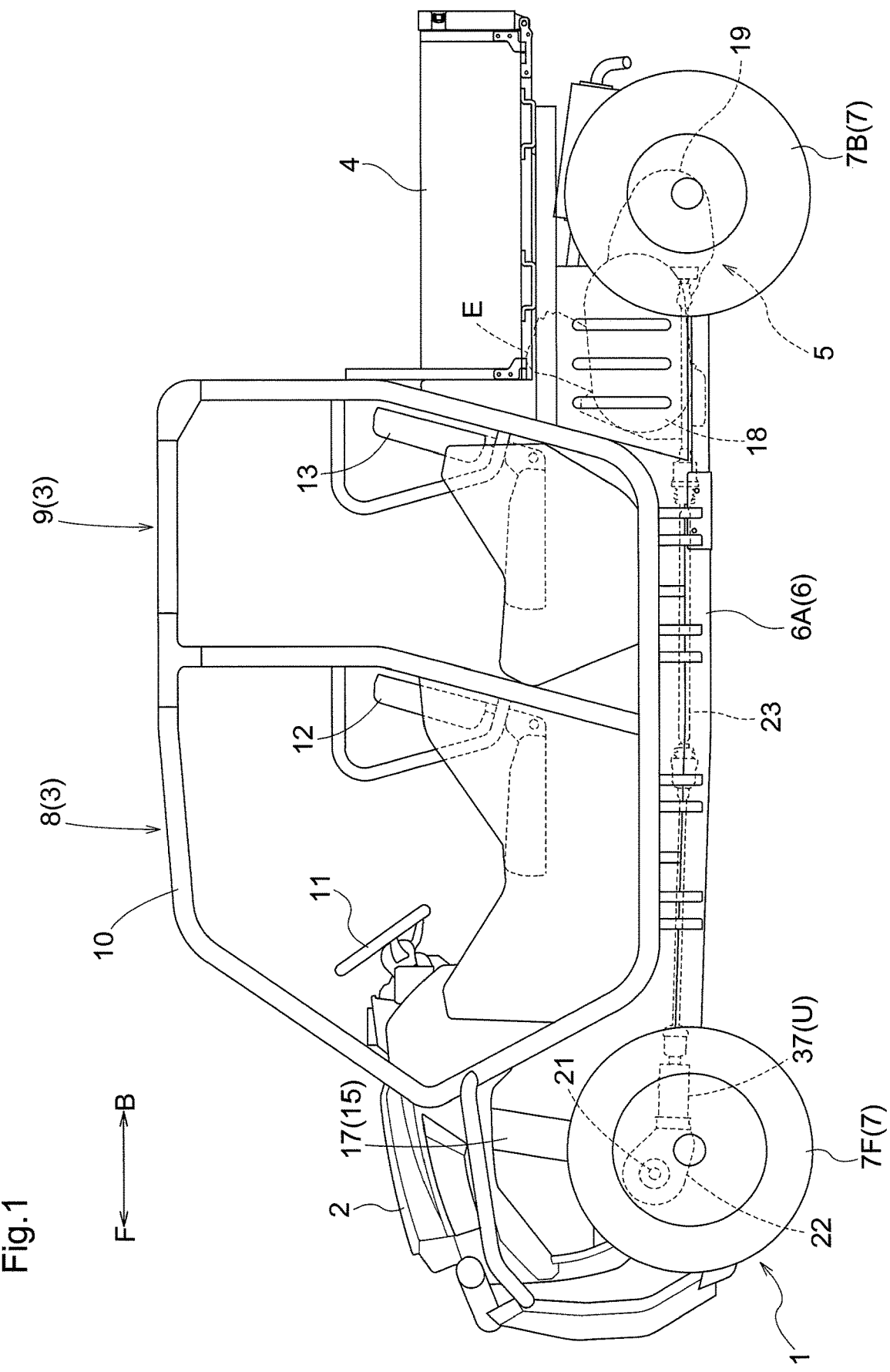
FIG. 1 is a left side view showing a multi-purpose vehicle.

FIG. 1 shows a utility vehicle (a multi-purpose vehicle) corresponding to a "work vehicle" relating to the present invention. This vehicle includes a traveling machine body 1, a hood 2, a boarding section 3 where passengers are to board, a dumping type load carrier bed 4, a water-cooled engine E and a speed changer section 5. The traveling vehicle body 1 includes a machine body frame 6 and a traveling device 7. The machine body frame 6 includes left and right main frames 6A extending along a machine body front/rear direction as seen in a side view.

The traveling device 7 includes steerable and drivable left and right front wheels 7F and non-steerable and drivable left and right rear wheels 7B. The traveling device 7 is configured to be switchable between a two-wheel drive state in which only the left and right rear wheels 7B are driven and a four-wheel drive state in which both the left and right front wheels 7F and the left and right rear wheels 7B are driven.

The hood 2 is disposed forwardly of the boarding section 3. The hood 2 accommodates a radiator (not shown) for cooling water for cooling the engine E, etc.

The boarding section 3 includes a front boarding section 8, a rear boarding section 9, a ROPS 10 for protecting passengers. The front boarding section 8 includes a steering wheel 11 and a front seat 12. The steering wheel 11 is connected to the left and right front wheels 7F to be able to steer these front wheels 7F via a power steering device 14 (see FIG. 2 and FIG. 3). The rear boarding section 9 includes a rear seat 13.

The load carrier bed 4 is disposed rearwardly of the boarding section 3. The engine E and the speed changer section 5 are disposed downwardly of the load carrier bed 4.

Figure 2:
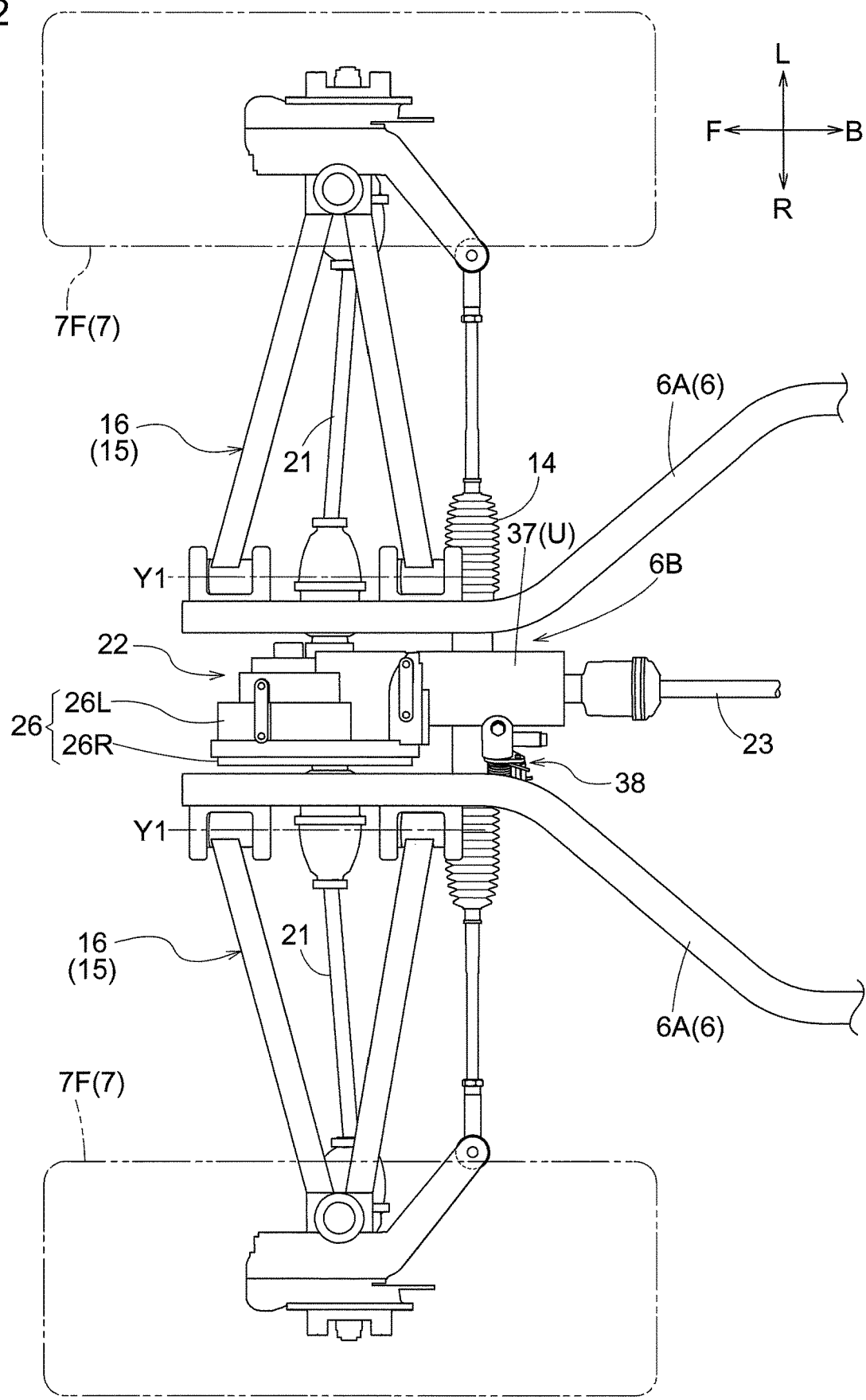
FIG. 2 is a bottom view showing a front portion of a traveling machine body.

As shown in FIG. 1 and FIG. 2, the left and right front wheels 7F are supported to front portions of the left and right main frames 6A via left and right suspension devices 15. Between the front portions of the left and right main frames 6A, there is formed a narrow width portion 6B having a reduced spacing between the left and right main frames 6A. Each suspension device 15 includes a suspension arm 16 and a dumper 17. The suspension arm 16 is supported to the front portion of the main frame 6A to be vertically pivotable about a pivot axis Y1 extending along the machine body front/rear direction. At the leading end portion of the suspension arm 16, the front wheel 7F is supported to be steerable. The dumper 17 is provided between the machine body frame 6 and the suspension arm 16.

Figure 3:
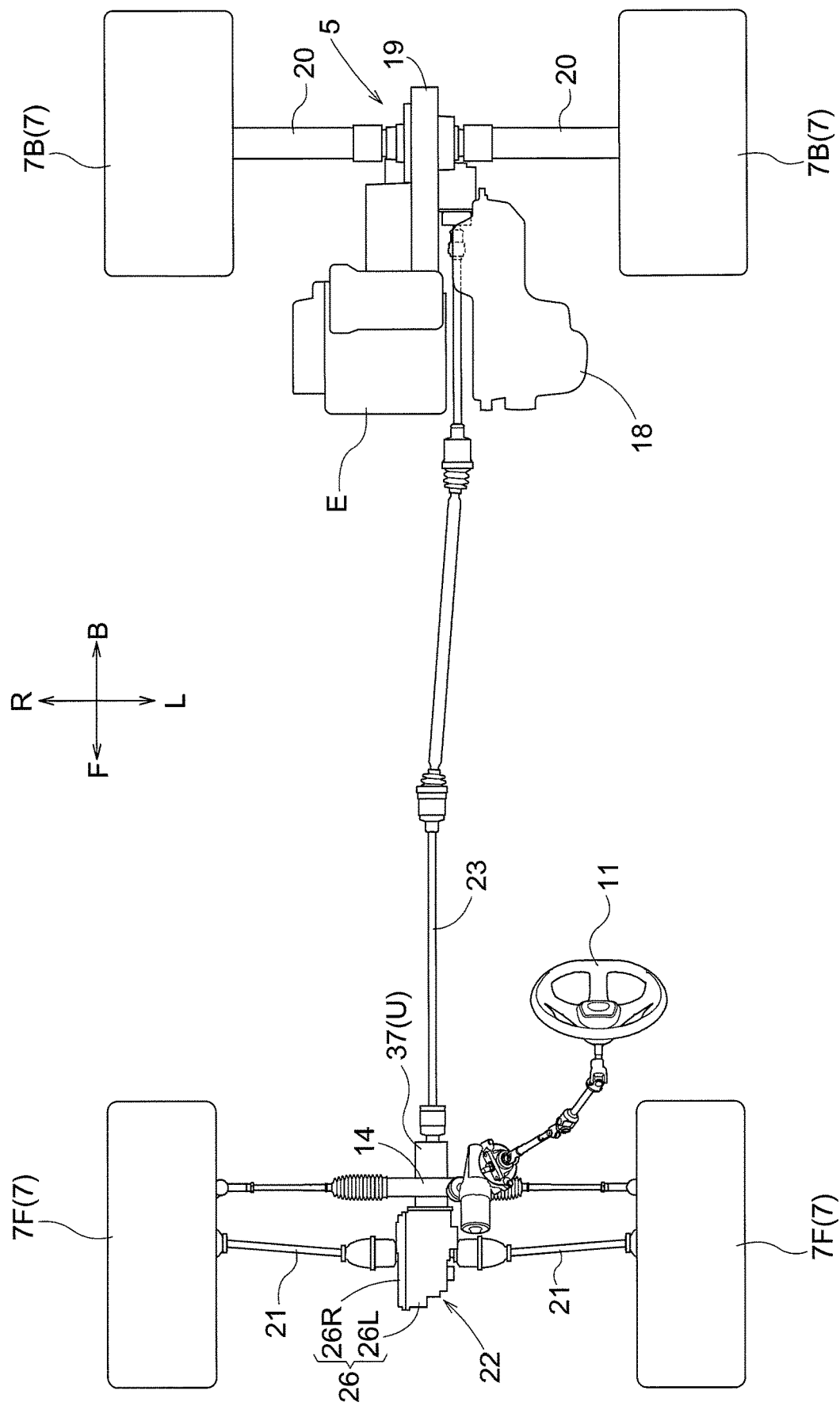
FIG. 3 is a plan view showing a power transmission arrangement.

As shown in FIG. 3, the speed changer section 5 includes a belt type stepless speed changer device 18 which steplessly changes the speed of the power from the engine E and a transmission 19 which speed-changes the power from the stepless speed changer device 18. The transmission 19 includes a gear type speed changer mechanism (not shown) and a differential device (not shown). To this transmission 19, left and right rear axles 20 are connected to be able to transmit power from the transmission 19. The power from the transmission 19 is to be transmitted to the left and right rear wheels 7B via the left and right rear axles 20.

[Power Transmission Unit]

There is provided a power transmission unit 22 for transmitting power from the transmission 19 to the left and right front wheels 7F via left and right front axles 21. Between the transmission 19 and the power transmission unit 22, there is provided a transmission shaft 23 for transmitting the power from the transmission 19 to the power transmission unit 22. This transmission shaft 23 extends to the forward side from the transmission 19.

Figure 4:
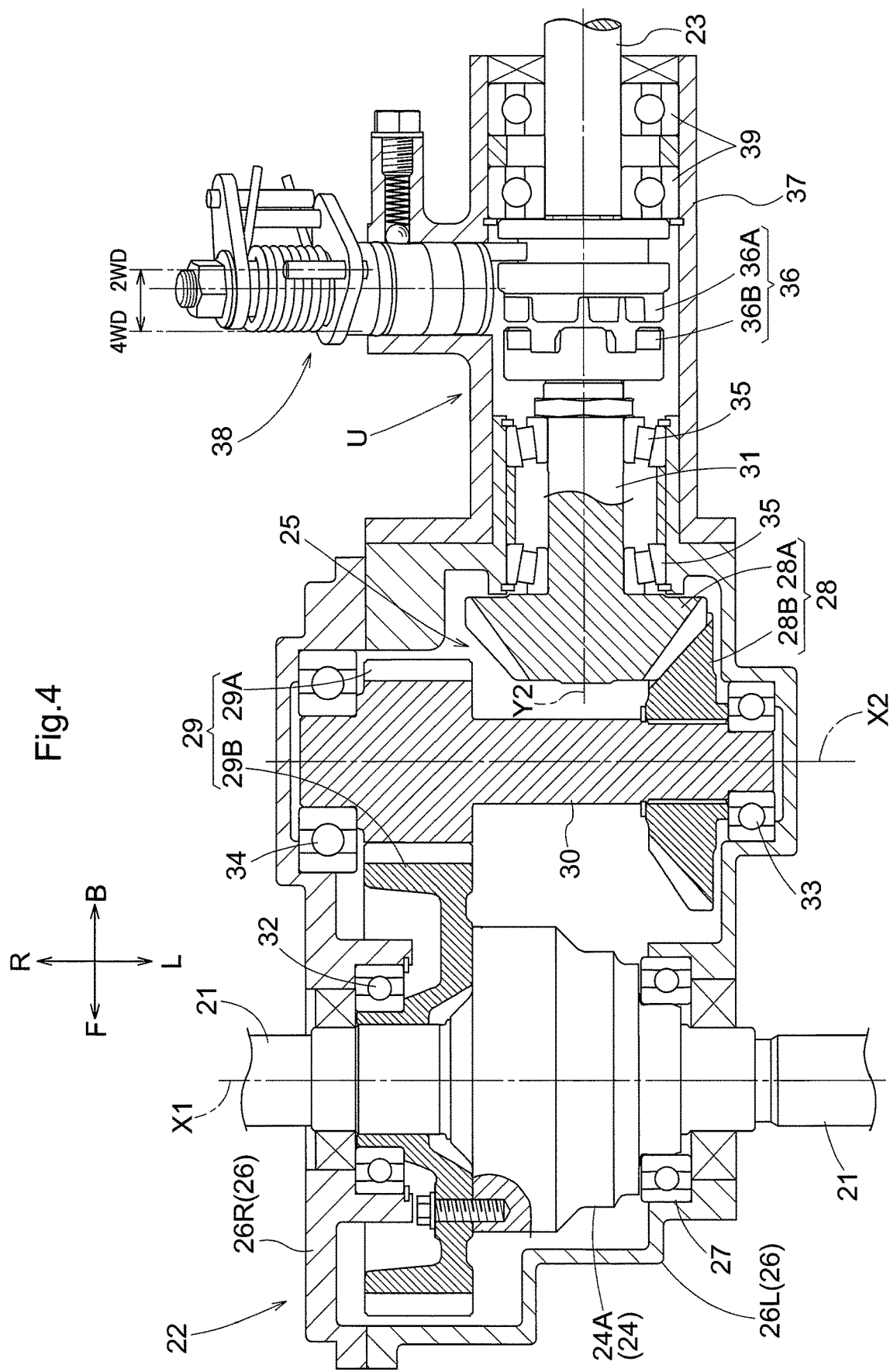
FIG. 4 is a plan view in section showing a power transmission unit in a two-wheel drive state.
Figure 5:
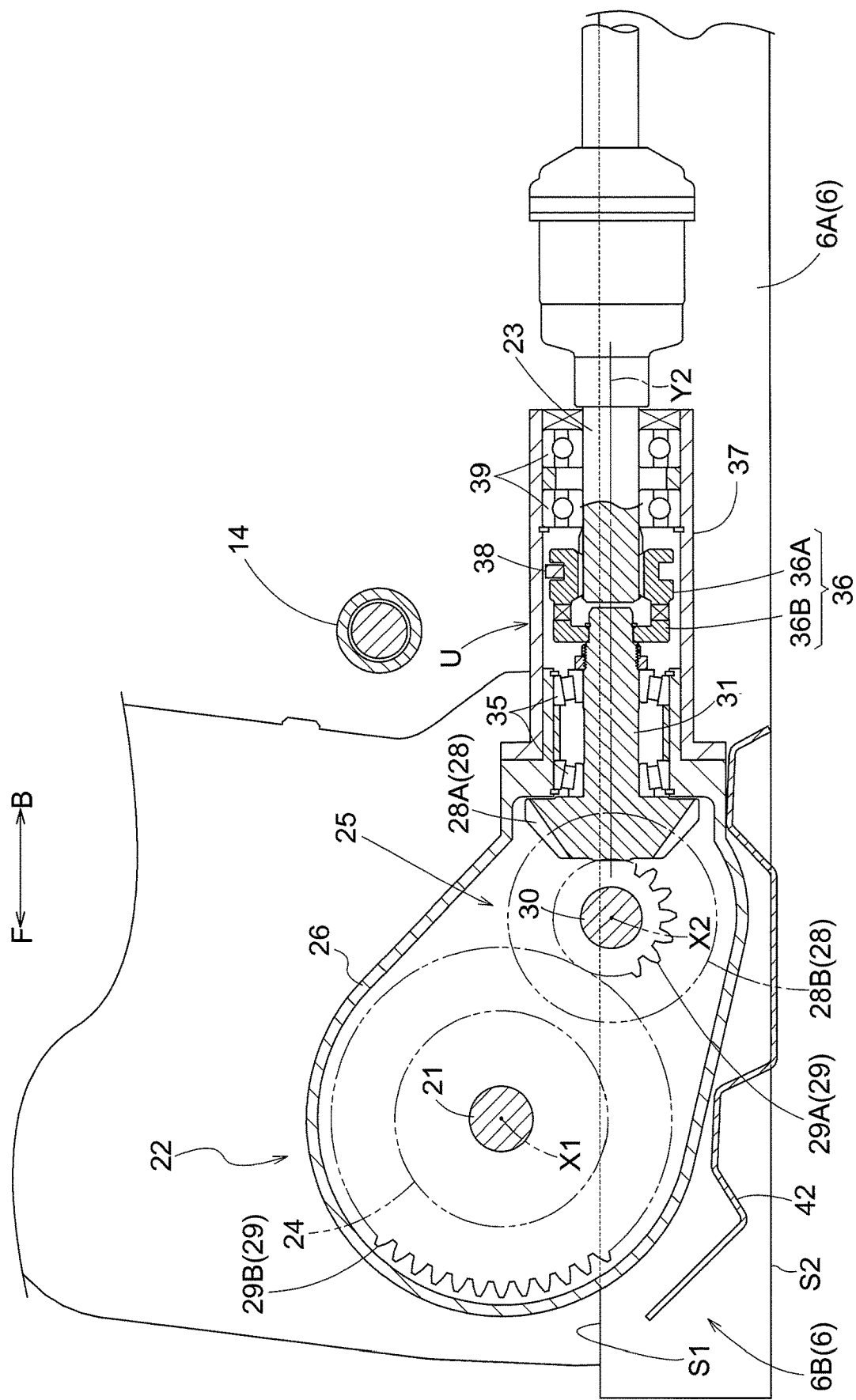
FIG. 5 is a left side view in section showing the power transmission unit.
Figure 6:
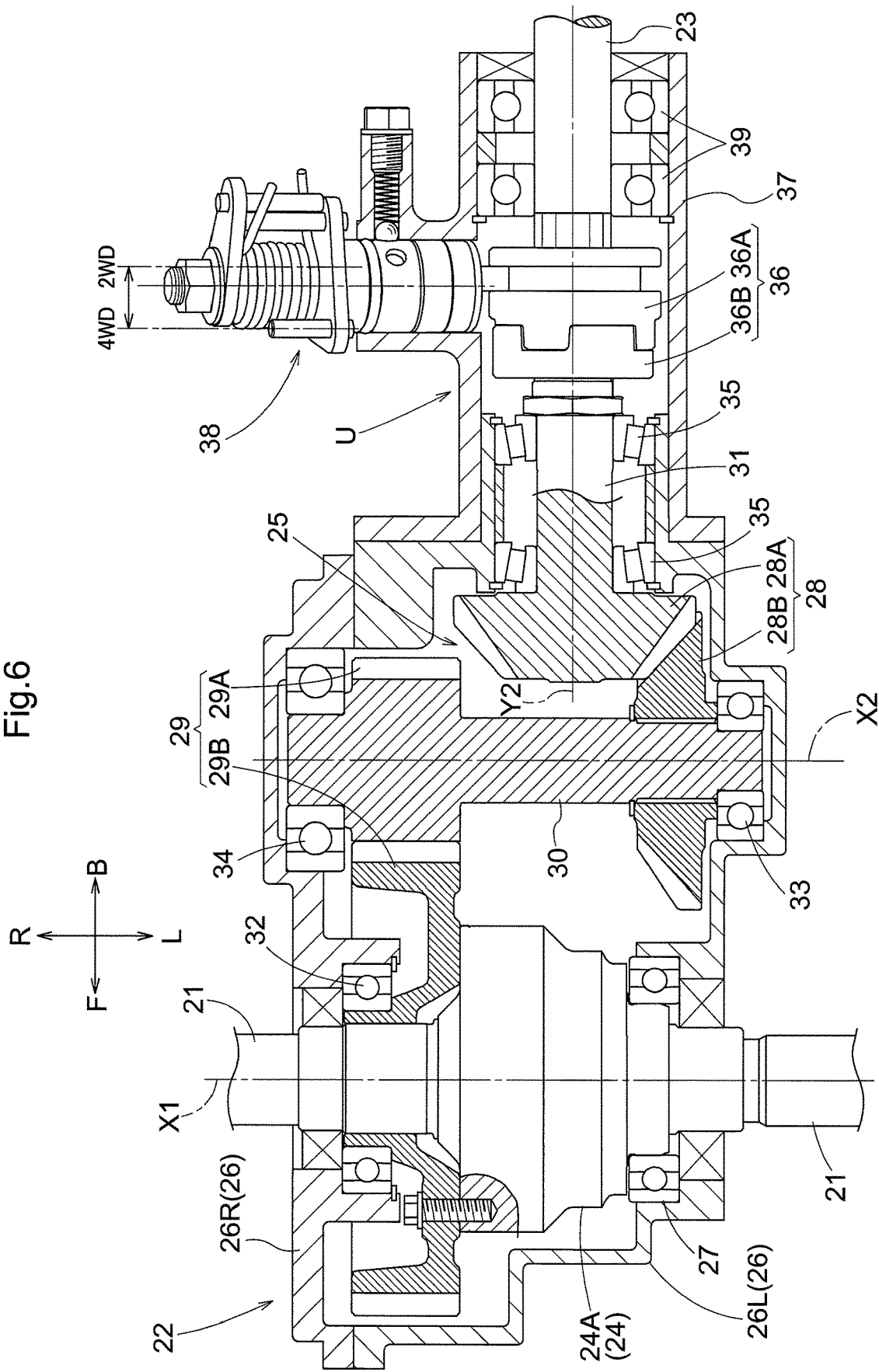
FIG. 6 is a plan view in section showing the power transmission unit in a four-wheel drive state.

As shown in FIG. 4 and FIG. 5, the power transmission unit 22 includes a differential device 24 for transmitting power to the left and right front axles 21, a power transmission mechanism 25 for transmitting power to the differential device 24 and a front axle case 26 which accommodates the differential device 24 and the power transmission mechanism 25. The power transmission unit 22 is disposed in the narrow width portion 6B. The lower end of the power transmission unit 22 does not protrude downwardly beyond a lower face S2 of the main frame 6A. Downwardly of the power transmission unit 22, there is provided a cover 42 configured to cover the power transmission unit 22 from the under side of this power transmission unit 22.

The front axle case 26 is configured to be separable into a left case portion 26L and a right case portion 26R. The front axle case 26 is disposed with its upper face being under a rearwardly inclined posture as seen in the side view.

In the instant embodiment, the differential device 24 is constituted of an LSD (Limited Slip Differential) device. To this differential device 24, the left and right front axles 21 are connected to be able to transmit the power from the differential device 24. The differential device 24 includes a differential case 24A. This differential case 24A is supported to the front axle case 26 (left case portion 26L) via a bearing 27 to be rotatable about a rotational axis X1 extending along a machine body left/right direction.

[Power Transmission Mechanism]

The power transmission mechanism 25 includes a first gear mechanism 28 to which the power from the transmission shaft 23 is transmitted, a second gear mechanism 29 for transmitting power from the first gear mechanism 28 to the differential device 24, a support shaft 30 and an input shaft 31.

The first gear mechanism 28 includes a first drive gear 28A to which the power from the transmission shaft 23 is transmitted and a first driven gear 28B meshing with the first drive gear 28A. In the instant embodiment, the first drive gear 28A and the first driven gear 28B are respectively constituted of a spiral bevel gear. The first drive gear 28A is configured to be rotatable about a rotational axis Y2 extending along the machine body front/rear direction. The first drive gear 28A is formed at the front end portion of the input shaft 31 to be integral with this input shaft 31.

The first driven gear 28B is configured to be rotatable about a rotational axis X2 extending along the machine body left/right direction. Namely, the first driven gear 28B is configured to be rotatable about the rotational axis X2 orthogonal to the rotational axis Y2 of the first drive gear 28A. The first driven gear 28B is spline-engaged to the left side portion of the support shaft 30. The first driven gear 28B comprises a gear larger in diameter (having a greater number of teeth) than the first drive gear 28A to allow speed reduction between the first drive gear 28A and the first driven gear 28B.

The second gear mechanism 29 includes a second drive gear 29A rotatable with the first driven gear 28B and a second driven gear 29B meshing with the second drive gear 29A. In the instant embodiment, the second drive gear 29A and the second driven gear 29B are respectively constituted of a helical gear. The second drive gear 29A is configured to be rotatable about the same rotational axis X2 as the first driven gear 28B. The second drive gear 29A is formed at a right side portion of the support shaft 30 to be integral with this support shaft 30.

The second driven gear 29B is bolt-coupled to a right side portion of the differential case 24A to be rotatable with this differential case 24A. The second driven gear 29B is supported to the front axle case 26 (right case portion 29R) via a bearing 32 to be rotatable about the rotational axis X1 extending along the machine body left/right direction. Namely, the second driven gear 28B is configured to be rotatable about the rotational axis X1 parallel with the rotational axis X2 of the second drive gear 29A. The second driven gear 29B comprises a gear larger in diameter (having a greater number of teeth) than the second drive gear 29A to allow speed reduction between the second drive gear 29A and the second driven gear 29B.

The support shaft 30 is provided to extend along the machine body left/right direction. The support shaft 30 supports the first driven gear 28B and the second drive gear 29A. The support shaft 30 is supported to the front axle case 26 via left and right bearings 33, 34 to be rotatable about the rotational axis X2 extending along the machine body left/right direction. The left end portion of the support shaft 30 is supported to the left case portion 26L via the bearing 33. The right end portion of the support shaft 30 is supported to the right case portion 26R via the bearing 34.

The support shaft 30 is disposed downwardly of the front axle 21. Namely, the axis (rotational axis X2) of the support shaft 30 is located downwardly of the axis (rotational axis X1) of the front axle 21. In other words, the axis (rotational axis X2) of the support shaft 30 is located downwardly of the upper face S1 of the main frame 6A.

The input shaft 31 is provided to protrude rearwards from a rear portion of the front axle case 26. The input shaft 31 is supported to the front axle case 26 via front and rear bearings 35 to be rotatable about the rotational axis Y2 extending along the machine body front/rear direction. To the front end portion of the input shaft 31, the first drive gear 28A is supported.

The input shaft 31 is disposed downwardly of the front axle 21. Namely, the axis (rotational axis Y2) of the input shaft 31 is located downwardly of the axis (rotational axis X1) of the front axle 21. In other words, the axis (rotational axis Y2) of the input shaft 31 is located at the same height position as the axis (rotational axis X2) of the support shaft 30. Upwardly of the input shaft 31, there is provided the power steering device 14 for steering the left and right front wheels 7F.

[Clutch Mechanism]

Between the transmission shaft 23 and the input shaft 31, there is provided a clutch mechanism 36 (corresponding to a "switchover device" relating to the present invention) capable of switching over between a power transmission state for transmitting power from the transmission shaft 23 to the input shaft 31 and a power transmission blocking state for not transmitting the power from the transmission shaft 23 to the input shaft 31. As this clutch mechanism 36 is switched over between the power transmission state and the power transmission blocking state, the traveling device 7 is switched over between the four-wheel drive state and the two-wheel drive state.

In the instant embodiment, the clutch mechanism 36, a clutch case 37 accommodating the clutch mechanism 36 and a switchover mechanism 38 for switching over the clutch mechanism 36 between the power transmission state and the power transmission blocking state are together configured into a single unit (a drive wheel switchover unit U).

The drive wheel switchover unit U is disposed, in the narrow width portion 6B, rearwardly adjacent the power transmission unit 22. The lower end of the drive wheel switchover unit U does not protrude downwardly beyond the lower face S2 of the main frame 6A.

The clutch mechanism 36 comprises a meshing type pawl clutch (a dog clutch). The clutch mechanism 36 includes a drive pawl 36A provided at the front end portion of the transmission shaft 23 and a driven pawl 36B provided at the rear end portion of the input shaft 31. The drive pawl 36A is movable along the axis (rotational axis Y2) direction of the transmission shaft 23 relative to the transmission shaft 23 and also non-rotatable about the axis (rotational axis Y2) of the transmission shaft 23 relative to the transmission shaft 23. The driven pawl 36B is non-movable along the axis (rotational axis Y2) direction of the input shaft 31 relative to the input shaft 31 and also non-rotatable about the axis (rotational axis Y2) of the input shaft 31 relative to the input shaft 31.

The clutch case 37 is bolt-coupled to the rear face portion of the front axle case 26 to be attachable/detachable to/from the front axle case 26. The front end portion of the transmission shaft 23 is inserted into the clutch case 37 from the rear side and also is rotatably supported to the clutch case 37 via the front and rear bearings 39.

The switchover mechanism 38 is connected to the drive pawl 36A to be able to move this drive pawl 36A along the axis (rotational axis Y2) direction of the transmission shaft 23. Here, in the front boarding section 8, there is provided a manually operable operational tool (not shown) for switching the clutch mechanism 36 between the power transmission state and the power transmission blocking state. This operational tool is connected to the switchover mechanism 38 via an interlocking mechanism (not shown). When a driver operates the operational tool, via the interlocking mechanism and the switchover mechanism 38, the clutch mechanism 36 can be switched over between the power transmission state and the power transmission blocking state (moving the drive pawl 36A along the axis (rotational axis Y2) direction of the transmission shaft 23).

Figure 7:
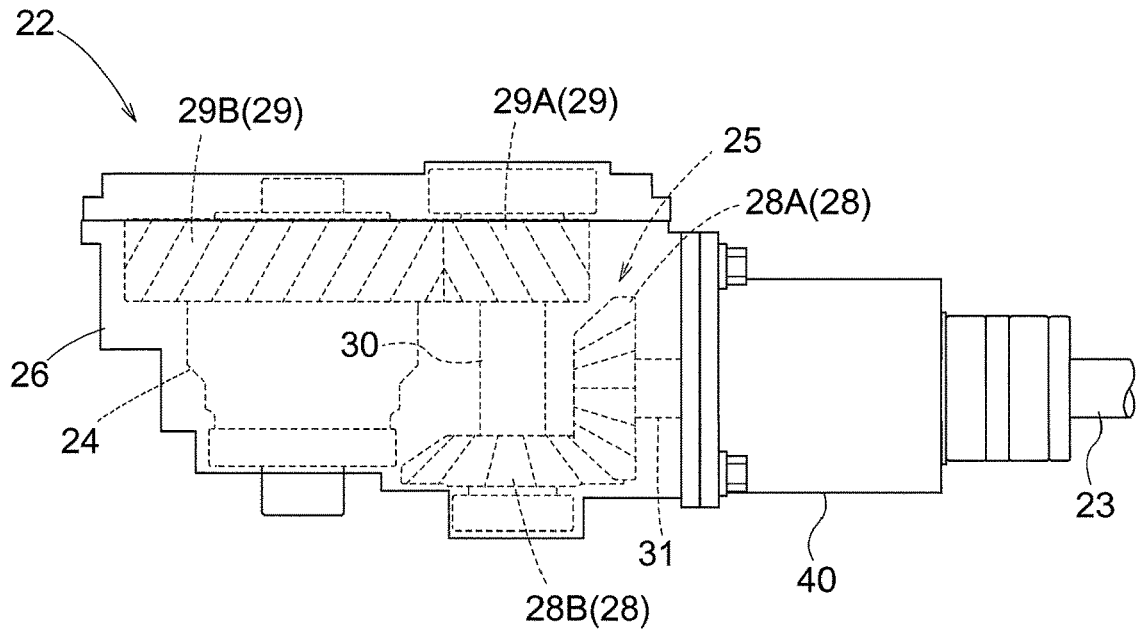
FIG. 7 is a plan view showing a switchover device relating to a first further embodiment.

Other Embodiments (1) In the foregoing embodiment, the "switchover device" relating to the present invention is constituted of the clutch mechanism 36. However, the "switchover device" relating to the present invention may be an electrically powered switchover device. In FIG. 7, e.g. an electromagnetic clutch 40 is employed as such electrically powered switchover device. The electromagnetic clutch 40 is disposed rearwardly adjacent the front axle case 26 and also bolt-coupled to the rear face portion of the front axle case 26.

Figure 8:
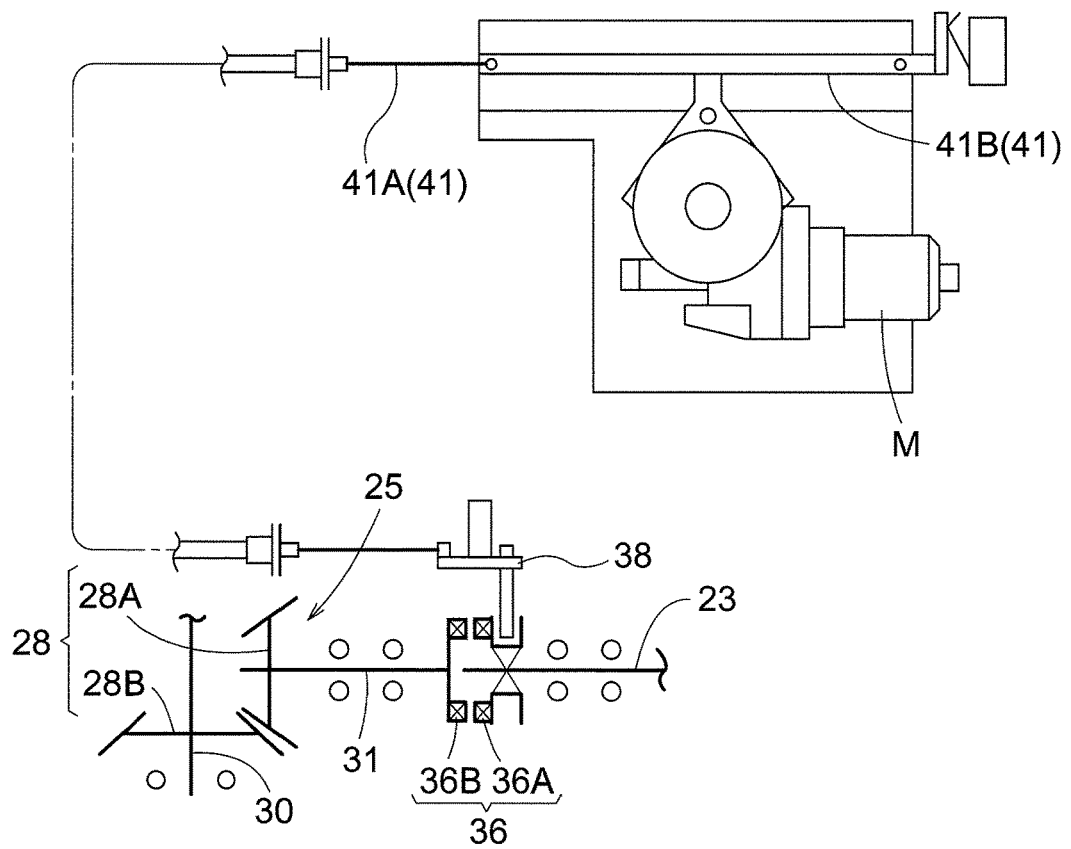
FIG. 8 is a view showing a switchover device relating to a second further embodiment.

(2) In the foregoing embodiment, by means of a driver's operation of the operational tool, the clutch mechanism 36 can be switched over between the power transmission state and the power transmission blocking state via the interlocking mechanism and the switchover mechanism 38. Alternatively, as shown in FIG. 8, the switchover mechanism 38 may be connected to a motor M via an interlocking mechanism 41. The interlocking mechanism 41 includes a rod 41B which is pushed/pulled by driving of the motor M and a wire 41A provided between the switchover mechanism 38 and the rod 41B. The wire 41A is constituted of a push-pull type wire. As the power of the motor M is transmitted to the switchover mechanism 38 via the rod 41B and the wire 41A, the clutch mechanism 36 will be switched over between the power transmission state and the power transmission blocking state.

(3) In the foregoing embodiment, the differential device 24 is constituted of the differential limiting device (LSD). Alternatively, the differential device 24 may be constituted of a differential device other than such LSD.

(4) In the foregoing embodiment, the first drive gear 28A and the first driven gear 28B are respectively constituted of a spiral bevel gear.

Alternatively, the first drive gear 28A and the first driven gear 28B may be respectively constituted of a straight bevel gear.

(5) In the foregoing embodiment, the second drive gear 29A and the second driven gear 29B are respectively constituted of a spiral (helical) gear. Alternatively, the second drive gear 29A and the second driven gear 29B may be respectively constituted of a spur gear.

(6) In the foregoing embodiment, the drive wheel switchover unit U is disposed rearwardly adjacent the power transmission unit 22. Alternatively, the drive wheel switchover unit U may be disposed adjacent the transmission 19.

(7) The present invention is applicable not only to a multi-purpose vehicle, but also to an agricultural work vehicle such as a tractor, a combine, a rice planter, or a construction work vehicle.

The invention claimed is:
1. A work vehicle comprising:
a power transmission unit including:
a differential device for transmitting power to left and right axles;
a power transmission mechanism for transmitting power to the differential device; and
a transmission shaft for transmitting power to the power transmission unit;
wherein the power transmission mechanism includes:
a first gear mechanism to which power is transmitted from the transmission shaft; and
a second gear mechanism that transmits power from the first gear mechanism to the differential device,
wherein the first gear mechanism includes:
a first drive gear to which power is transmitted from the transmission shaft, and
a first driven gear rotatable about a rotational axis orthogonal to a rotational axis of the first drive gear and meshing with the first drive gear,
wherein the second gear mechanism includes:
a second drive gear rotatable about the same rotational axis as the first driven gear and rotatable with the first driven gear; and
a second driven gear rotatable about a rotational axis parallel with the rotational axis of the second drive gear and meshing with the second drive gear,
wherein the power transmission unit includes a case which accommodates the differential device and the power transmission mechanism, and
wherein the power transmission mechanism includes an input shaft supporting the first drive gear at a first end and a switchover device at a second end, the switchover device configured to be capable of switching over between a power transmission state for transmitting the power from the transmission shaft to the input shaft and a power transmission blocking state for not transmitting the power from the transmission shaft to the input shaft, the second end of the input shaft protrudes rearwards from a rearmost portion of the case into a switchover device case and the input shaft being disposed downwardly of the axle.

2. The work vehicle of claim 1, wherein the power transmission mechanism includes a support shaft provided to extend along a machine body left/right direction and supporting the first driven gear and the second drive gear, the support shaft being disposed downwardly of the axle.

3. The work vehicle of claim 1, wherein a power steering device for steering left and right wheels is disposed upwardly of the input shaft.

4. The work vehicle of claim 1,
wherein the switchover device is disposed rearwardly adjacent the power transmission unit.

5. The work vehicle of claim 4, further comprising:
left and right main frames extending long a machine body front/rear direction as seen in a side view;
wherein between front portions of the left and right main frames, there is formed a narrow width portion having a reduced spacing between the left and right main frames; and
wherein the power transmission unit and the switchover device are disposed in the narrow width portion.

6. The work vehicle of claim 1, further comprising:
a machine body frame including right and left main frames each extending in a machine body front/rear direction as seen in a side view,
wherein a lower end of the power transmission unit does not protrude downwardly beyond a lower face of the main frame.

7. The work vehicle of claim 1, further comprising:
a cover configured to cover the power transmission unit from an under side of the power transmission unit, the cover being disposed downwardly of the power transmission unit.

* * * * *